US011887376B2

(12) United States Patent
Huang et al.

(10) Patent No.: US 11,887,376 B2
(45) Date of Patent: Jan. 30, 2024

(54) METHOD AND APPARATUS OF ESTIMATING ROAD CONDITION, AND METHOD AND APPARATUS OF ESTABLISHING ROAD CONDITION ESTIMATION MODEL

(71) Applicant: Beijing Baidu Netcom Science Technology Co., Ltd., Beijing (CN)

(72) Inventors: Jizhou Huang, Beijing (CN); Hui Zhao, Beijing (CN); Deguo Xia, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 274 days.

(21) Appl. No.: 17/517,702

(22) Filed: Nov. 3, 2021

(65) Prior Publication Data

US 2022/0058403 A1  Feb. 24, 2022

(30) Foreign Application Priority Data

Dec. 3, 2020  (CN) .......................... 202011410518.4

(51) Int. Cl.
*G06V 30/00*  (2022.01)
*G06V 20/56*  (2022.01)
(Continued)

(52) U.S. Cl.
CPC .......... *G06V 20/56* (2022.01); *B60R 16/0231* (2013.01); *G06F 18/214* (2023.01);
(Continued)

(58) Field of Classification Search
CPC ...... G06V 20/56; G06V 10/40; G06V 20/176; G06V 20/41; G06V 20/46; G06V 30/274;
(Continued)

(56) References Cited

U.S. PATENT DOCUMENTS 8,670,592 B2  3/2014 Zhang
10,403,138 B2  9/2019 Wu
(Continued)

FOREIGN PATENT DOCUMENTS

CN  102722982 B  1/2016
CN  109615862 A  4/2019
(Continued)

OTHER PUBLICATIONS

Official Communication issued in corresponding European Patent Application No. 21205616.2, dated Apr. 4, 2022.
(Continued)

*Primary Examiner* — Molly Wilburn
*Assistant Examiner* — Ahmed A Nasher
(74) *Attorney, Agent, or Firm* — Keating & Bennett, LLP

(57) ABSTRACT

The present disclosure provides a method and apparatus of estimating a road condition, and a method and apparatus of establishing a road condition estimation model, which relates to a field of big data and intelligent traffic. The method includes: acquiring, for a first preset duration before a first moment, a sequence of user tracks for a road and a sequence of road images for the road; extracting a track-related feature of the road from the sequence of the user tracks, and extracting an image-related feature of the road from the sequence of the road images; and inputting the track-related feature of the road and the image-related feature of the road into a pre-trained road condition estimation model, so as to determine, for a second preset duration after the first moment, a road condition information of the road by using an estimated result of the road condition estimation model.

14 Claims, 6 Drawing Sheets

(51) Int. Cl.
  *G06V 20/40* (2022.01)
  *G06V 10/40* (2022.01)
  *G06V 30/262* (2022.01)
  *G06V 20/10* (2022.01)
  *B60R 16/023* (2006.01)
  *G06F 18/24* (2023.01)
  *G06F 18/214* (2023.01)

(52) U.S. Cl.
  CPC .............. *G06F 18/24* (2023.01); *G06V 10/40* (2022.01); *G06V 20/176* (2022.01); *G06V 20/41* (2022.01); *G06V 20/46* (2022.01); *G06V 30/274* (2022.01)

(58) Field of Classification Search
  CPC .... G06V 10/774; G06V 10/267; G06V 20/00; G06V 20/54; B60R 16/0231; G06F 18/214; G06F 18/24; G06N 3/045; G06N 3/08; G06N 5/01; G06N 20/10; G06N 20/20; G06Q 10/047; G06Q 10/063; G06Q 50/26; G06Q 50/30; G08G 1/0112; G08G 1/0129; G08G 1/0133; G08G 1/04; G08G 1/0145; G08G 1/0125; G01C 21/3492; G01C 21/3691
  See application file for complete search history.

(56) References Cited

U.S. PATENT DOCUMENTS

| | | | | |
|---|---|---|---|---|
| 11,042,742 | B1* | 6/2021 | Yang | G06T 7/11 |
| 2019/0329768 | A1 | 10/2019 | Shalev-Shwartz et al. | |
| 2020/0043324 | A1* | 2/2020 | Yang | G06N 5/02 |
| 2021/0239480 | A1 | 8/2021 | Fang et al. | |
| 2021/0239483 | A1 | 8/2021 | Fang et al. | |

FOREIGN PATENT DOCUMENTS

| | | |
|---|---|---|
| CN | 106781592 B | 7/2019 |
| CN | 110364008 A | 10/2019 |
| CN | 111292549 A | 6/2020 |
| CN | 111353009 A | 6/2020 |
| CN | 111477012 A | 7/2020 |
| CN | 111488770 A | 8/2020 |
| CN | 111489555 A | 8/2020 |
| CN | 111611955 A | 9/2020 |
| CN | 111915878 A | 11/2020 |
| CN | 111950537 A | 11/2020 |
| JP | 06-4795 A | 1/1994 |
| JP | 2017-211957 A | 11/2017 |
| JP | 2020-101908 A | 7/2020 |
| KR | 10-2002-0092107 A | 12/2002 |
| KR | 10-2019-0107057 A | 9/2019 |

OTHER PUBLICATIONS

Official Communication issued in corresponding Singaporean Patent Application No. 1020211344U, dated May 13, 2022.
Huang et al., "Traffic Congestion Level Prediction Based on Recurrent Neural Networks", IEEE, 2020 International Conference on Artificial Intelligence in Information and Communication, Feb. 19, 2020, pp. 248-252.
Official Communication issued in corresponding Chinese Patent Application No. 202011410518.4, dated Jul. 18, 2022.
Official Communication issued in corresponding Japanese Patent Application No. 2021-104711, dated Aug. 4, 2022.
Official Communication issued in corresponding Korean Patent Application No. 10-2021-0080407, dated Jan. 27, 2023.
Official Communication issued in corresponding Thai Patent Application No. 2101007496, dated Nov. 28, 2022.
Huang et al., "Traffic Congestion Level Prediction Based on Recurrent Neural Networks", IEEE, Feb. 2020, pp. 248-252.

* cited by examiner

METHOD AND APPARATUS OF ESTIMATING ROAD CONDITION, AND METHOD AND APPARATUS OF ESTABLISHING ROAD CONDITION ESTIMATION MODEL

CROSS REFERENCE TO RELATED APPLICATION(S)

This application claims the priority of the Chinese patent application 202011410518.4 filed on Dec. 3, 2020, the content of which is hereby used for reference.

TECHNICAL FIELD

The present disclosure relates to a field of computer application, in particular to a method and apparatus of estimating a road condition and a method and apparatus of establishing a road condition estimation model in big data and intelligent traffic.

BACKGROUND

With a rapid growth of urban traffic demand, a problem of traffic congestion has become increasingly serious. The traffic congestion may increase commuting durations, waste fuels, and increase pollution. Moreover, traffic accidents tend to occur in this scenario, which has a safety hazard.

If a road condition can be estimated in products such as maps, then users may be provided with reference timely, so as to choose a suitable route. The users may further be provided with sequential services such as route planning and route suggestions based on the estimated road condition.

SUMMARY

In view of this, according to the present disclosure, there is provided a method and apparatus of estimating a road condition, and a method and apparatus of establishing a road condition estimation model, so as to estimate a road condition.

According to a first aspect, there is provided a method of estimating a road condition, including:
  acquiring, for a first preset duration before a first moment, a sequence of user tracks for a road and a sequence of road images for the road;
  extracting a track-related feature of the road from the sequence of the user tracks, and extracting an image-related feature of the road from the sequence of the road images; and
  inputting the track-related feature of the road and the image-related feature of the road into a pre-trained road condition estimation model, so as to determine, for a second preset duration after the first moment, a road condition information of the road by using an estimated result of the road condition estimation model.

According to a second aspect, there is provided a method of establishing a road condition estimation model, including:
  acquiring training data, including a sequence of user tracks for a sample road for a first preset duration before a second moment, a sequence of road images for the sample road for the first preset duration before the second moment and a road condition label for the sample road for a second preset duration after the second moment;
  extracting a track-related feature of the sample road from the sequence of the user tracks, and extracting an image-related feature of the sample road from the sequence of the road images; and
  training a classification model, by using the track-related feature of the sample road and the image-related feature of the sample road as an input of the classification model, and using the road condition label for the sample road as a target output of the classification model, so as to obtain the road condition estimation model.

According to a third aspect, there is provided an apparatus of estimating a road condition, including:
  a sequence acquiring unit, configured to acquire, for a first preset duration before a first moment, a sequence of user tracks for a road and a sequence of road images for the road;
  a feature extracting unit, configured to extract a track-related feature of the road from the sequence of the user tracks, and extract an image-related feature of the road from the sequence of the road images; and
  a road condition estimating unit, configured to input the track-related feature of the road and the image-related feature of the road into a pre-trained road condition estimation model, so as to obtain, for a second preset duration after the first moment, a road condition information of the road by using an estimated result of the road condition estimation model.

According to a fourth aspect, there is provided an apparatus of establishing a road condition estimation model, including:
  a sample acquiring unit, configured to acquire training data, including a sequence of user tracks for a sample road for a first preset duration before a second moment, a sequence of road images for the sample road for the first preset duration before the second moment and a road condition label for the sample road for a second preset duration after the second moment;
  a feature extracting unit, configured to extract a track-related feature of the sample road from the sequence of the user tracks, and extract an image-related feature of the sample road from the sequence of the road images; and
  a model training unit, configured to train a classification model, by using the track-related feature of the sample road and the image-related feature of the sample road as an input of the classification model, and using the road condition label for the sample road as a target output of the classification model, so as to obtain the road condition estimation model.

According to a fifth aspect, there is provided an electronic device, including:
  at least one processor; and
  a memory communicatively connected to the at least one processor,
  the memory stores instructions executable by the at least one processor, and the instructions, when executed by the at least one processor, cause the at least one processor to implement the method described above.

According to a sixth aspect, there is provided a non-transitory computer-readable storage medium having computer instructions stored thereon, the computer instructions allows a computer to implement the method described above.

Other effects of the optional implementations above may be described below with reference to specific embodiments.

BRIEF DESCRIPTION OF THE ACCOMPANYING DRAWINGS

The drawings are used to better understand the solution and do not constitute a limitation to the present disclosure, in which:

FIG. 1 schematically shows a system architecture to which the embodiments of the present disclosure may be applied;

DETAILED DESCRIPTION

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

A main way for estimating a road condition is mining based on user tracks. That is, a future road condition is estimated by a large number of history tracks and history road conditions. However, this method has following disadvantages.

1) If the number of the tracks is low, then an accuracy of estimating the road condition may be affected.
2) In complex road scenarios, such as tunnels, overpasses, construction sites, urban canyon, etc., track locating may be interfered, and the estimation for the road condition may be inaccurate.
3) When the road is congested, drivers tend to close map applications. In this case, the user tracks may not be acquired, leading to an inaccurate estimation for the road condition.

In view of this, according to the present disclosure, there is provided a method of estimating a road condition, combining the user tracks with road images. The method is described in detail with reference to the embodiments below.

Figure 1:
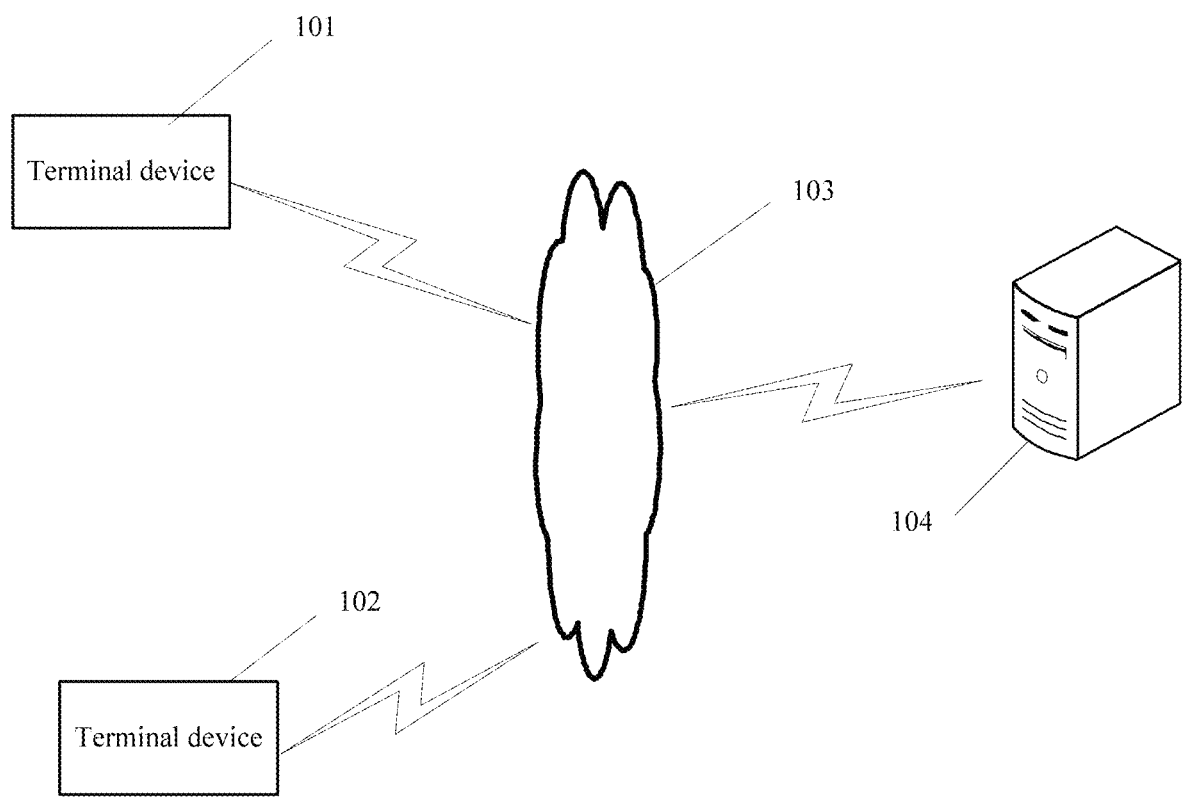

FIG. 1 schematically shows a system architecture to which the embodiments of the present disclosure may be applied, so as to facilitate an understanding of the system architecture in global. As shown in FIG. 1, the system architecture may include terminal devices 101 and 102, a network 103 and a server 104. The network 103 is used as a media for providing communication links between the terminal devices 101, 102 and the server 104. The network 103 may include various connection types, such as wired communication links, wireless communication links, fiber-optic cables, etc.

The users may use the terminal devices 101 and 102 to interact with the server 104 via the network 103. Various applications, such as map applications, voice interaction applications, web browser applications, communication applications, etc., may be installed in the terminal devices 101 and 102.

The terminal devices 101 and 102 may include various electronic devices supporting and displaying map applications, including but not limited to smartphones, tablets, intelligent wearable devices, crowdsourcing collection devices, etc. An apparatus according to the present disclosure may be provided and operated in the server 104. The apparatus may be implemented as a plurality of software or software modules (for providing distributed services, for example), or may be implemented as a single software or software module, which is not limited here.

For example, an apparatus of estimating a road condition may be provided and operated in the server 104. The terminal devices 101 and 102 may be used as collection devices for collecting user track data, road image data, etc. The server 104 may acquire and store the user track data, the road image data, etc. reported by the terminal devices 101 and 102. Special collecting devices may further be used for collecting the user track data, the road image data, etc. The apparatus of estimating the road condition estimates the road condition of the road by using the method according to the embodiments of the present disclosure. The apparatus may transmit road condition information of the road to the terminal device 101 or 102 actively. Alternatively, the apparatus may transmit the road condition information of the road to the terminal device 101 or 102 in response to a request from the terminal device 101 or 102.

For example, an apparatus of establishing a road condition estimation model may be provided and operated in the server 104 above. The server 104 may train the road condition estimation model using training data and store the road condition estimation model on the server side, so that the road condition may be estimated using the road condition estimation model.

The server 104 may be a single server or a server group including a plurality of servers. It should be understood that the numbers of terminal devices, networks, and servers in FIG. 1 are only schematic. There may be any number of terminal devices, networks and servers as needed.

Figure 2:
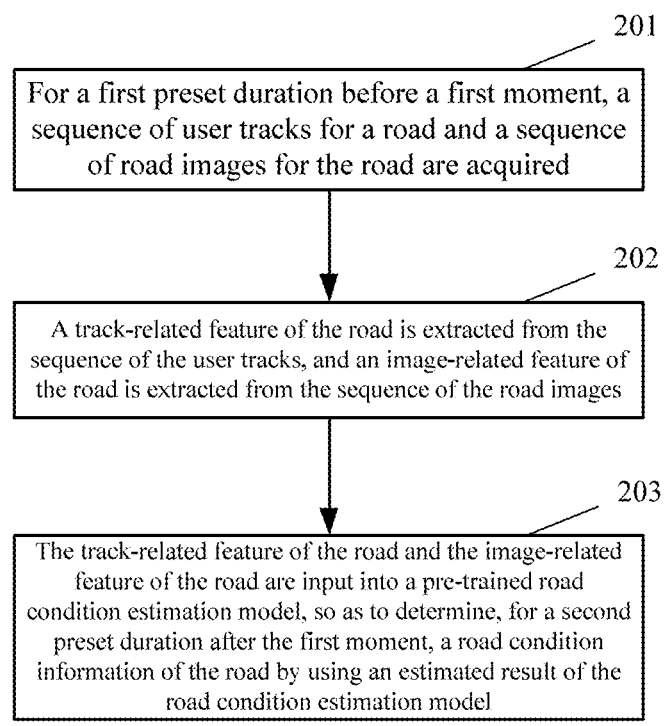
FIG. 2 shows a flowchart of a method of estimating a road condition according to the embodiments of the present disclosure.

FIG. 2 shows a flowchart of a method of estimating a road condition according to the embodiments of the present disclosure. As shown in FIG. 2, the method may include following operations.

In 201, for a first preset duration before a first moment, a sequence of user tracks for a road and a sequence of road images for the road are acquired.

The sequence of the user tracks may be a sequence of track points corresponding to sequential moments, which is reported by a collection terminal (i.e. corresponding to the terminal device shown in FIG. 1) having locating functions. The sequence of the road images may be a sequence of road images collected by a collection terminal having image collecting functions. The collection terminal may be an intelligent terminal device used by a user, or a road collection crowdsourcing device on a vehicle for collecting images and a video. The server side stores the sequence of the user tracks and the sequence of the road images uploaded by the collection terminal.

In the embodiments, the first moment may be a current moment. That is, the road condition information for the second preset duration in the future may be estimated by using the sequence of the user tracks and the sequence of the road images for the first preset duration before the current moment. In addition, it is possible to estimate for a preset period in history, for example, to estimate a road condition information for the second preset duration from a history moment. In this case, for the first preset duration before the history moment, a sequence of user tracks and a sequence of road images may be acquired. The former case is frequently used where the first moment is a current moment.

In 202, a track-related feature of the road is extracted from the sequence of the user tracks, and an image-related feature of the road is extracted from the sequence of the road images.

In the embodiments, since a speed feature may reflect a congestion condition of the road, the track-related feature may include the speed feature. Generally, the road condition is good when a speed is continuously high, and the road condition is usually poor when the speed is continuously low.

In addition to the speed feature, other features may be extracted from the sequence of the user tracks as the track-related features, such as a condition of a track deviated from a road centerline.

The image-related feature may include at least one of a road empty-degree feature, a traffic flow feature and a building feature. These features may reflect road conditions that may appear on the road to a certain extent. Specific methods of extracting these features may be described in detail in the embodiments below.

In 203, the track-related feature of the road and the image-related feature of the road are input into a pre-trained road condition estimation model, so as to determine, for a second preset duration after the first moment, a road condition information of the road by using an estimated result of the road condition estimation model.

The road condition estimation model is actually a pre-trained classification model. The road condition information for the second preset duration after the first moment may be estimated by the road condition estimation model, based on the sequence of the user tracks for the road and the sequence of the road images for the road for the first preset duration before the first moment. The estimated road condition information may include several road condition categories, such as smooth traffic, slow traffic and congested traffic. For another example, the road condition categories may include smooth traffic, slow traffic, congested traffic and seriously congested traffic.

A method of training the road condition estimation model may be described in detail in the embodiments below.

According to the process shown in the embodiments of the present disclosure, the road condition information for the second preset duration after the first moment may be predicted based on the sequence of the user tracks for the road and the sequence of the road images for the road for the first preset duration before the first moment. Thus, the road condition may be estimated.

The operation 201 of acquiring, for the first preset duration before the first moment, the sequence of the user tracks for the road and the sequence of the road images for the road may be described below in combination with embodiments.

The road in the present disclosure may be a road, determined using various manners, where a road condition needs to be estimated. The various manners include but are not limited to following manners.

In a first manner, the road may be a preset target road. For example, the road may be an important road specified, etc.

In a second manner, the road may be a road in an electronic fence for the road condition. In this manner, an area may be preset. The area may be regarded as a virtual fence, and is called "electronic fence for the road condition". The collection terminal reports the track points to the server side in real time. Once these track points trigger the electronic fence for the road condition (for example, if it is shown that the track points have entered the area of the electronic fence for the road condition), then the collection terminal may be instructed to collect a sequence of user tracks and a sequence of road images of the road in the electronic fence for the road condition.

In the third manner, the road may be a road where a track point meets a preset triggering condition for estimating the road condition.

The collection terminal may report the user tracks in real time. Thus, the server side may determine a number of the track points on the road and a speed of the track points on the road according to various user tracks. For example, if the number of the track points on the road is greater than a certain number, then it is indicated that the road condition on the road is poor. Alternatively, if the speed of the track points on the road has been smaller than a certain speed threshold within a certain duration, then it is indicated that the road condition on the road is poor. Therefore, this road may be determined as the road where the road condition needs to be estimated.

As one implementation, the server side may transmit information of the road to the collection terminal. After receiving the information of the road, the collection terminal is used to collect road images or a video of the road and upload the road images or the video of the road to the server side.

As another implementation, the server side may further transmit a collection instruction to a collection terminal on the road above. After receiving the collection instruction, the collection terminal collects road images or a video on the current road and uploads the road images or the video on the current road to the server side.

A sequence of road images collected by the collection terminal on a road $l_i$ may be represented as $<I_{t-N}, I_{t-N+1}, \ldots, I_{t-1}, I_t>$, that is, a sequence of images for N moments before a moment t. Accordingly, the collection terminal may report user track points in real time. After the track points are matched, according to moments, with corresponding images in the sequence of the images, a sequence of user tracks may be represented as $<p_{t-N}, p_{t-N+1}, \ldots, p_{t-1}, p_t>$. Each of the track points in the sequence of the user tracks may be represented as longitude and latitude coordinates, for example.

If a road video is uploaded by the collection terminal, then frames may be extracted from the road video, such that each road image in the sequence of the road images may correspond to each track points in the sequence of the user tracks in time. In this manner, the extracted frames may correspond to each track points in the sequence of the user tracks in time, and the extracted frames may constitute the sequence of the road images.

The operation 202 of extracting the track-related feature of the road from the sequence of the user tracks, and extracting the image-related feature of the road from the sequence of the road images may be described below in combination with embodiments.

The track-related feature of the road extracted from the sequence of the user tracks may include the speed feature. An instantaneous speed on the road may reflect the road condition. An instantaneous speed of the track points may be obtained by a ratio of a distance difference to a time difference between two adjacent track points.

As an optional implementation, the speed feature for the sequence of the user tracks may be reflected as a speed feature in a sequence level, including but not limited to a speed mean of each track point in the sequence of the user tracks and a speed variance of each track point in the sequence of the user tracks.

The image-related feature of the road extracted from the sequence of the road images includes but is not limited to at least one of the road empty-degree feature, the traffic flow feature and the building feature.

Figure 3:
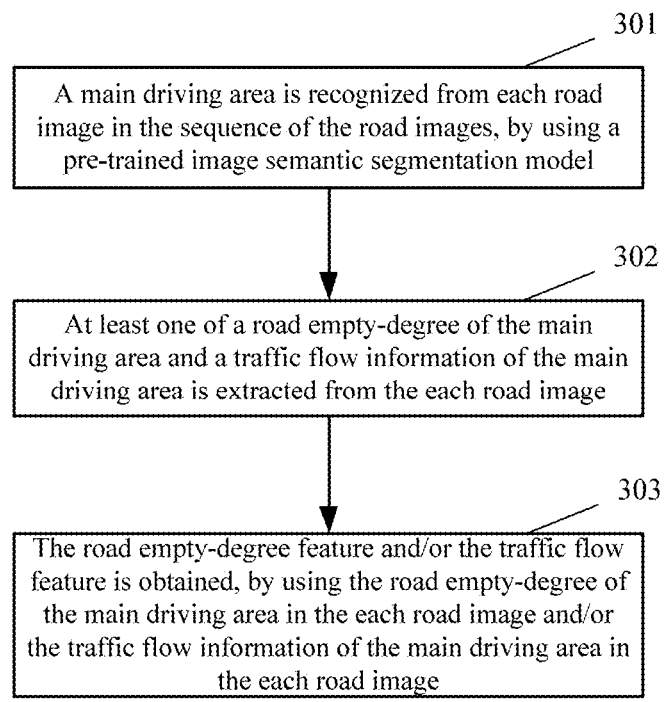
FIG. 3 shows a flowchart of a method of extracting an image-related feature according to the embodiments of the present disclosure.

An optional implementation is provided for extracting the image-related feature. Referring to FIG. 3, the method of extracting the image-related feature may include following operations.

In 301, a main driving area is recognized from each road image in the sequence of the road images, by using a pre-trained image semantic segmentation model.

The image semantic segmentation model is a model frequently used in the field of image processing. The image semantic segmentation model may classify each pixel in an image into a specific category based on a pixel level. In the embodiments, the image semantic segmentation model is used to classify each pixel in the road image into an object area category (such as a driving area, a vehicle, a building, a street lamp, a sky, a roadblock, double yellow lines, an isolation belt, a parking line, etc.) in road traffic.

Figure 4:
FIG. 4 shows an exemplary diagram of a road image according to the embodiments of the present disclosure.

FIG. 4 shows an exemplary diagram of a road image according to the embodiments of the present disclosure. For the road image, the image semantic segmentation model may recognize pixels for the driving area, pixels for the vehicle, pixels for the building, pixels for the sky, pixels for a road edge, pixels for the double yellow lines, etc.

When the image semantic segmentation model is pre-trained, the training data may include various road image samples and a label for each area category in the road image samples. When the image semantic segmentation model is trained based on the training data, an input of the semantic segmentation model may be a road image sample, a target output of the semantic segmentation model may be a classified result for each pixel, and the classified result is same as the label for each area category in the road image samples.

The image semantic segmentation model may include DeepLabV3, RefineNet, etc.

In this operation, after the area category corresponding to each pixel is identified for each road image by using the image semantic segmentation model, the driving area and at least one road environment area in the road image may be determined. The road environment area may be an area for objects in the road environment, such as the roadblock, the double yellow lines, the isolation belt, the road edge, etc. The main driving area in the road image may be obtained using these road environment areas. The main driving area refers to a driving area where the collection terminal for collecting the road images may drive. The driving area identified by the image semantic segmentation model may contain other lanes having different driving directions from the current collection terminal, such as a lane in an opposite direction outside the double yellow lines, a lane in an intersected direction of a three-dimensional road, a lane having a road construction, etc. The current collection terminal cannot drive in these lanes, such that these lanes should be excluded. Only the driving areas where the collection terminal may drive are determined. The main driving area may include one lane or a plurality of lanes in the same direction (because the collection terminal may change lanes when there are a plurality of lanes).

More specifically, there are restrictions (such as the road edge, the double yellow lines, the isolation belt and the roadblock) in the area where the collection terminal may drive. For example, in the road image captured by the collection terminal, the collection terminal may currently drive in an area between the road edge and the double yellow line, as shown in FIG. 4. For another example, in the road image captured by the collection terminal, the collection terminal may currently drive in an area between the road edge and the roadblock. Therefore, in the embodiments of the present disclosure, a linear fitting processing may be performed on road environment areas such as the roadblock, the double yellow lines, the isolation belt, the road edge, etc. After the linear fitting processing, a road area surrounded by these road environment areas is the main driving area. Alternatively, a largest road area of road areas surrounded by these road environment areas is the main driving area.

In 302, at least one of a road empty-degree of the main driving area and a traffic flow information of the main driving area is extracted from the each road image.

As an optional implementation, the road empty-degree of the main driving area may be extracted based on following operations.

In operation S11, the largest inscribed rectangle of a road surface is determined in the main driving area.

In operation S12, at least one of a ratio of an area of the largest inscribed rectangle to an area of the main driving area, a ratio of a width of the largest inscribed rectangle to a width of the main driving area, and a ratio of a height of the largest inscribed rectangle to a height of the main driving area is taken as an indicator of the road empty-degree of the main driving area.

In addition to the implementation above, other methods may further be used for extracting the road empty-degree. For example, a ratio of pixels for the road surface in the main driving area to pixels for the main driving area may be determined as the indicator of the road empty-degree of the main driving area.

As an optional implementation, the traffic flow information of the main driving area may be extracted based on following operations.

In operation S21, information of a category for each vehicle in the road image, an area for each vehicle in the road image and a confidence for each vehicle in the road image are extracted by using a target detection algorithm.

The target detection algorithm may include Faster-RCNN, YoloV3, etc. Vehicles in various categories may be extracted from the road image using the target detection algorithm. An area where the vehicles are located may be determined according to pixels of the vehicles. The area here refers to the area obtained by the image semantic segmentation model above. A confidence for each vehicle may be output using the target detection algorithm, that is, a confidence that the vehicle belongs to the output category.

In operation S22, the vehicles in the road image are filtered in following manners. Vehicles not in the driving area are removed, vehicles not belonging to a preset category are removed, and vehicles having confidence lower than a preset confidence threshold are removed.

If all the filtering manners are implemented, then it may be regarded as selecting vehicles belonging to the preset category in the main driving area and confidence for the selected vehicles meets certain requirements. For example, motor vehicles in the main driving area may be selected.

In operation S23, at least one of a number of the selected vehicles and a ratio of an area of the selected vehicles to the area of the main driving area is taken as the indicator of the traffic flow information of the main driving area.

The ratios involving areas above may all be determined by ratios regarding to numbers of pixels in corresponding areas. For example, the ratio of the area of the selected vehicles to the area of the main driving area may be a ratio of a number of pixels for corresponding vehicles to a number of pixels in a corresponding main driving area. Other algorithms such as geometry based methods may further be used.

Content in different positions of an image may have different impacts on an actual situation. For example, vehicles in the middle of the image and having smaller image depths may have larger impacts, and vehicles on both sides of the image and having larger image depths may have smaller impacts. Therefore, as an optional embodiment, the road empty-degree and the traffic flow information may be weighted according to a preset weight matrix. The weight matrix corresponds to each position in the road image, and the weight matrix is preset according to positions and image depths.

In 303, the road empty-degree feature and/or the traffic flow feature is obtained, by using the road empty-degree of the main driving area in the each road image and/or the traffic flow information of the main driving area in the each road image.

The sequence of the road images contains a plurality of road images. Therefore, in the embodiments, a mean road empty-degree of each road image in the sequence of the road images and/or a road empty-degree variance of each road image in the sequence of the road images may be regarded as the road empty-degree feature, and a mean traffic flow of each road image in the sequence of the road images and/or a traffic flow variance of each road image in the sequence of the road images may be regarded as the traffic flow feature of the road.

In addition to the road empty-degree feature and the traffic flow feature above, the building feature may further be extracted from the road image. Recognized results for each pixel in the road image by the image semantic segmentation model may include a building area. A similarity mean and/or a similarity variance of building areas of adjacent road images in the sequence of the road images may be regarded as the building feature of the road.

As an optional embodiment, a SIFT (scale-invariant feature transform) algorithm may be performed on the building area in the road image, so as to obtain the building feature. For the sequence of the road images, similarities of building features in adjacent road images may be calculated pairwise. Then, the similarity mean and/or the similarity variance may be calculated as the building feature of the road.

When the road traffic is congested, vehicles move slowly. In the sequence of the road images collected by the collection terminal, there are few changes between buildings in each road image, that is, the similarity is high. The higher the similarity mean of the building features in road images are, the more congested the road traffic is. Therefore, the building feature is adopted.

The operation 203 of inputting the track-related feature of the road and the image-related feature of the road into the pre-trained road condition estimation model, so as to determine, for the second preset duration after the first moment, the road condition information of the road by using the estimated result of the road condition estimation model may be described below in combination with embodiments.

In the embodiments of the present disclosure, the road condition estimation model may be a classification model, such as GBDT (gradient boosting decision tree), DNN (deep neural networks), LR (logistic regression), SVM (support vector machines) and other models.

After the track-related feature of the road and the image-related feature of the road are input into the road condition estimation model, the road condition estimation model may output the road condition information of the road. The road condition information may be several preset road condition categories, such as congested traffic and smooth traffic. The preset road condition categories may further be congested traffic, slow traffic and smooth traffic. Alternatively, the preset road condition categories may be seriously congested traffic, congested traffic, slow traffic and smooth traffic.

In addition to the track-related feature of the road and the image related feature of the road extracted in operation 202 above, a time feature corresponding to the first preset duration before the first moment and a property feature of the road may further be input into the road condition estimation model.

The time feature may include at least one of: a holiday or not, a workday or not, office hours or not, after hours or not, etc. The time feature is introduced because the road condition is usually regular in time, whether on a workday or not, or whether in office hours or not may have impacts on the road conditions.

The property feature of the road may include at least one of: a number of lanes, two-way roads or not, a road grade, etc. The property feature of the road is introduced because roads having different properties usually correspond to different road capacities, and different road capacities may have a direct impact on the road condition.

Figure 5:
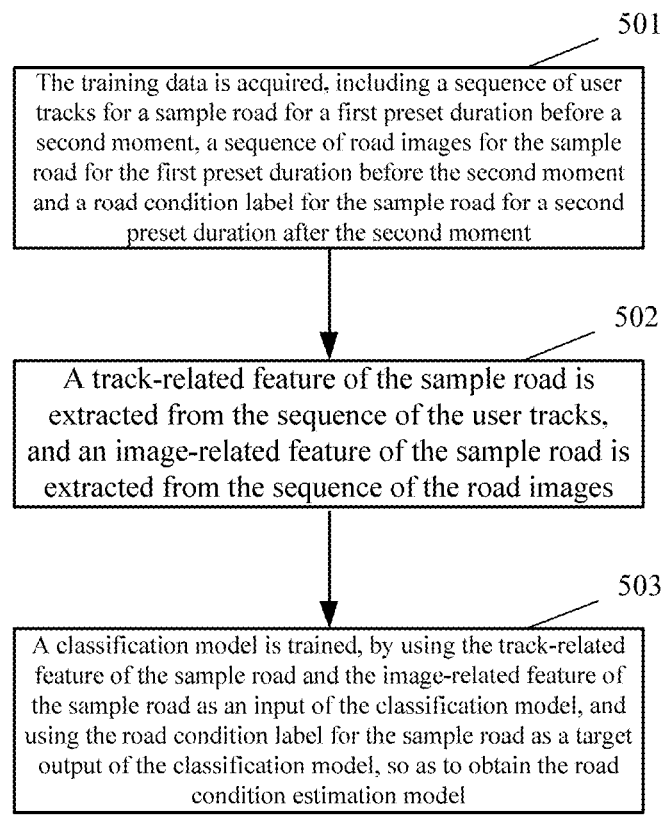
FIG. 5 shows a flowchart of a method of establishing a road condition estimation model according to the embodiments of the present disclosure.

FIG. 5 shows a flowchart of a method of establishing a road condition estimation model according to the embodiments of the present disclosure. As shown in FIG. 5, the method may include following operations.

In 501, the training data is acquired, including a sequence of user tracks for a sample road for a first preset duration before a second moment, a sequence of road images for the sample road for the first preset duration before the second moment and a road condition label for the sample road for a second preset duration after the second moment.

The training data may be obtained from history data of the collection terminal. The second moment is a history moment.

The sequence of user tracks for the sample road and the sequence of road images for the sample road may be acquired by the server side. Both sequences are collected by the collection terminal within the first preset duration before the history moment. The road condition for the second preset duration after the second moment is also a history data. A road condition label may be generated for each sample road by manual labeling.

The sample road may be a road having complete track data and road image data collected by the collection terminal and having a clear road condition. The sample road may further be a road selected based on other criteria.

In 502, a track-related feature of the sample road is extracted from the sequence of the user tracks, and an image-related feature of the sample road is extracted from the sequence of the road images.

The track-related feature of the sample road and the image-related feature of the sample road may be extracted using the same method for extracting the track-related feature and the image-related feature in operation 202 of FIG. 2. Relevant description may be referred above, which will not be repeated.

In 503, a classification model is trained, by using the track-related feature of the sample road and the image-related feature of the sample road as an input of the classification model, and using the road condition label for the sample road as a target output of the classification model, so as to obtain the road condition estimation model.

The classification model may be GBDT (gradient boosting decision tree), DNN (deep neural networks), LR (logistic regression), SVM (support vector machines) and other models.

The road condition label may be congested traffic or smooth traffic. The road condition label may further be congested traffic, slow traffic or smooth traffic. Alternatively, the road condition label may be seriously congested traffic, congested traffic, slow traffic or smooth traffic.

In addition to the track-related feature of the sample road and the image-related feature of the sample road, the features input into the classification model may further include a time feature corresponding to the first preset duration before the second moment, and/or a property feature of the sample road.

The time feature may include at least one of: a holiday or not, a workday or not, office hours or not, after hours or not, etc. The time feature is introduced because the road condition is usually regular in time, whether on a workday or not, or whether in office hours or not may have impacts on the road conditions.

The property feature of the road may include at least one of: a number of lanes, two-way roads or not, a road grade, etc. The property feature of the road is introduced because roads having different properties usually correspond to different road capacities, and different road capacities may have a direct impact on the road condition.

In a training process, a loss function may be constructed by using a difference between an output of the classification model and the target output. A value of the loss function is used to feedback forward to update parameters of the classification model, until a stop training condition is satisfied. The stop training condition may be satisfied when the value of the loss function is less than or equal to a preset loss function threshold, or when the iteration has been performed for a preset threshold value of times, for example.

K-folds (k-layer cross validation) may be used in the training process. The training data is divided into k parts, and k is a positive integer greater than 1. One of the k parts is selected as a test data each time, and other k−1 parts are used as the training data. Each of the k−1 parts is used to train the classification model respectively and the test data is used to test the classification model. In this way, k classification models and error rates of the k classification models in data testing may be obtained. A classification model having the least mean error rate is selected and the selected model is trained using all the training data, so as to obtain a final road condition estimation model.

The above is the detailed description of the method according to the present disclosure, and the apparatus according to the present disclosure may be described in detail in combination with the embodiments below.

Figure 6:
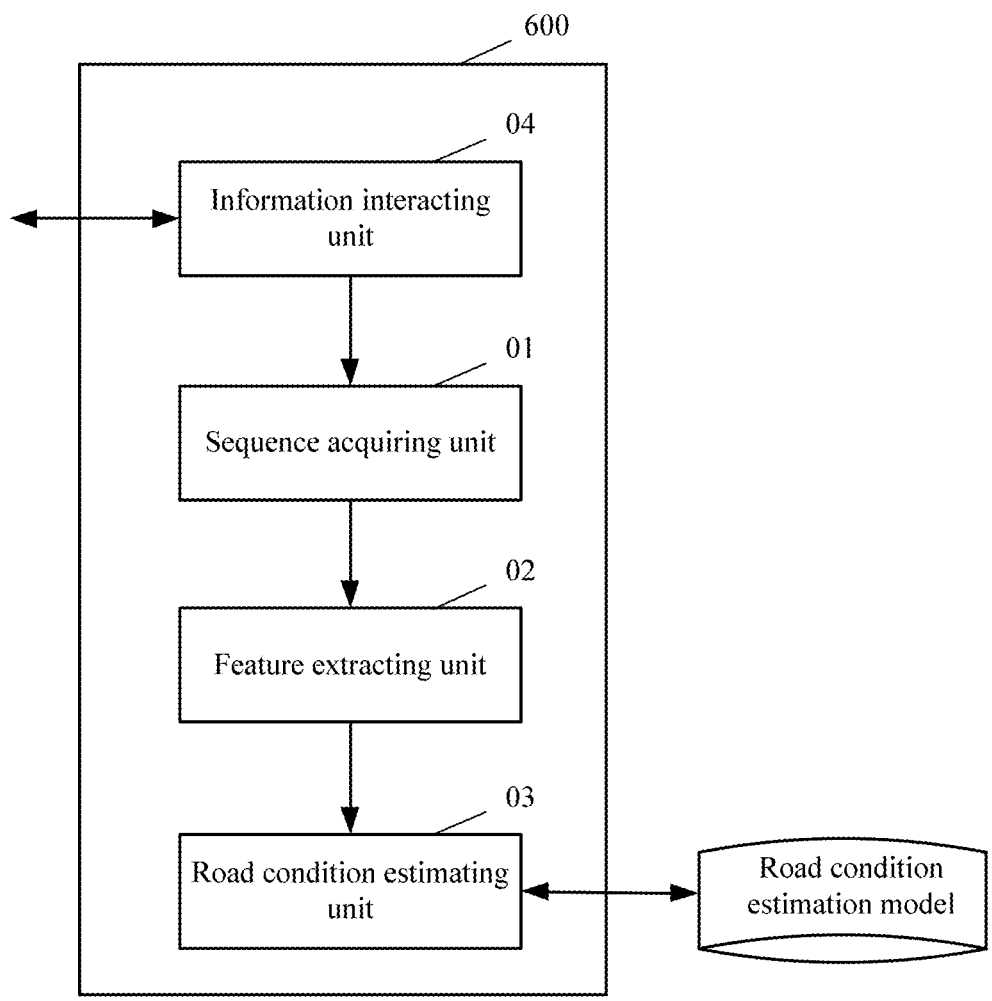
FIG. 6 shows a structural diagram of an apparatus of estimating a road condition according to the embodiments of the present disclosure.

FIG. 6 shows a structural diagram of an apparatus of estimating a road condition according to the embodiments of the present disclosure. The apparatus may be an application on the server side, or may be a plug-in, a software development kit (SDK) and other functional units in the application on the server side. The apparatus may further be in a computer terminal having strong computing abilities. As shown in FIG. 6, the apparatus 600 of estimating a road condition may include: a sequence acquiring unit 01, a feature extracting unit 02, a road condition estimating unit 03, and an information interacting unit 04. Functions of each unit are as follows.

The sequence acquiring unit 01 is used to acquire, for a first preset duration before a first moment, a sequence of user tracks for a road and a sequence of road images for the road.

The road includes at least one of: a preset target road, a road in an electronic fence for the road condition, and a road where a track point meets a preset triggering condition for estimating the road condition.

The information interacting unit 04 is used to transmit information of the road to a collection terminal, so as to acquire the sequence of the user tracks and the sequence of the road images. The sequence of the user tracks and the sequence of the road images are collected by the collection terminal. Alternatively, the information interacting unit is used to transmit a collection instruction to a collection terminal on the road, so as to acquire the sequence of the user tracks and the sequence of the road images. The sequence of the user tracks and the sequence of the road images are collected by the collection terminal on the road.

The feature extracting unit 02 is used to extract a track-related feature of the road from the sequence of the user tracks, and extract an image-related feature of the road from the sequence of the road images.

The track-related feature of the road extracted from the sequence of the user tracks may include the speed feature. An instantaneous speed on the road may reflect the road condition. An instantaneous speed of the track points may be obtained by a ratio of a distance difference to a time difference between two adjacent track points.

The image-related feature includes at least one of a road empty-degree feature, a traffic flow feature and a building feature.

As an optional embodiment, the feature extracting unit 02, when extracting the image-related feature of the road from the sequence of the road images, may recognize a main driving area from each road image in the sequence of the road images, by using a pre-trained image semantic segmentation model; extract, from the each road image, at least one of a road empty-degree of the main driving area and a traffic flow information of the main driving area; and obtain the road empty-degree feature and/or the traffic flow feature, by using the road empty-degree of the main driving area in the each road image and/or the traffic flow information of the main driving area in the each road image.

The feature extracting unit 02, when recognizing the main driving area from the each road image in the sequence of the road images, by using the pre-trained image semantic segmentation model, may recognize, for the each road image, an area category corresponding to each pixel by using the pre-trained image semantic segmentation model, so as to determine a driving area and at least one road environment area from the each road image; and determine the main driving area from the driving area, by using the at least one road environment area.

Content in different positions of an image may have different impacts on an actual situation. For example, vehicles in the middle of the image and having smaller image depths may have larger impacts, and vehicles on both sides of the image and having larger image depths may have smaller impacts. Therefore, as an optional embodiment, the road empty-degree and the traffic flow information may be weighted according to a preset weight matrix. The weight matrix corresponds to each position in the road image, and the weight matrix is preset according to positions and image depths.

The sequence of the road images contains a plurality of road images. Therefore, in the embodiments, a mean road empty-degree of each road image in the sequence of the road images and/or a road empty-degree variance of each road image in the sequence of the road images may be regarded as the road empty-degree feature, and a mean traffic flow of each road image in the sequence of the road images and/or a traffic flow variance of each road image in the sequence of the road images may be regarded as the traffic flow feature of the road.

The feature extracting unit 02, when extracting the image-related feature of the road from the sequence of the road images, may recognize a building area from each road image in the sequence of the road images, by using a pre-trained image semantic segmentation model; and calculate a similarity mean and/or a similarity variance of building areas of adjacent road images in the sequence of the road images, as the building feature of the road.

The road condition estimating unit is used to input the track-related feature of the road and the image-related feature of the road into a pre-trained road condition estimation model, so as to obtain, for a second preset duration after the first moment, a road condition information of the road by using an estimated result of the road condition estimation model.

Moreover, the road condition estimating unit 03 is further used to input a time feature corresponding to the first preset duration before the first moment, and/or a property feature of the road into the pre-trained road condition estimation model.

The time feature may include at least one of: a holiday or not, a workday or not, office hours or not, after hours or not, etc. The time feature is introduced because the road condition is usually regular in time, whether on a workday or not, or whether in office hours or not may have impacts on the road conditions.

The property feature of the road may include at least one of: a number of lanes, two-way roads or not, a road grade, etc. The property feature of the road is introduced because roads having different properties usually correspond to different road capacities, and different road capacities may have a direct impact on the road condition.

The road condition estimation model may be a classification model, such as GBDT, DNN, LR, SVM and other models.

After the track-related feature of the road and the image-related feature of the road are input into the road condition estimation model, the road condition estimation model may output the road condition information of the road. The road condition information may be several preset road condition categories, such as congested traffic and smooth traffic. The preset road condition categories may further be congested traffic, slow traffic and smooth traffic. Alternatively, the preset road condition categories may be seriously congested traffic, congested traffic, slow traffic and smooth traffic.

Figure 7:
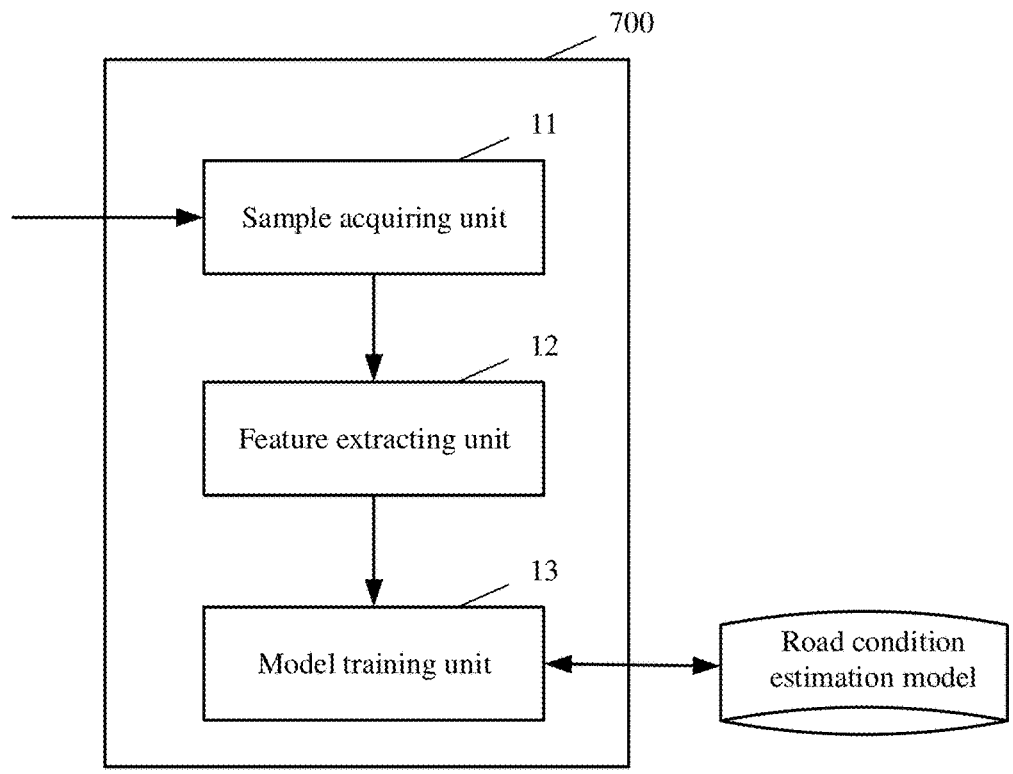
FIG. 7 shows a structural diagram of an apparatus of establishing a road condition estimation model according to the embodiments of the present disclosure.

FIG. 7 shows a structural diagram of an apparatus of establishing a road condition estimation model according to the embodiments of the present disclosure. The apparatus may be an application on the server side, or may be a plug-in, a software development kit (SDK) and other functional units in the application on the server side. The apparatus may further be in a computer terminal having strong computing abilities. As shown in FIG. 7, the apparatus 700 of establishing a road condition estimation model may include: a sample acquiring unit 11, a feature extracting unit 12, and a model training unit 13. Functions of each unit are as follows.

The sample acquiring unit 11 is used to acquire training data, including a sequence of user tracks for a sample road for a first preset duration before a second moment, a sequence of road images for the sample road for the first preset duration before the second moment and a road condition label for the sample road for a second preset duration after the second moment.

The feature extracting unit 12 is used to extract a track-related feature of the sample road from the sequence of the user tracks, and extract an image-related feature of the sample road from the sequence of the road images.

The track-related feature includes a speed feature.

The image-related feature includes at least one of a road empty-degree feature, a traffic flow feature and a building feature.

As an optional embodiment, the feature extracting unit 12, when extracting the image-related feature of the sample road from the sequence of the road images, may recognize a main driving area from each road image in the sequence of the road images, by using a pre-trained image semantic segmentation model; extract, from the each road image, at least one of a road empty-degree of the main driving area and a traffic flow information of the main driving area; and obtain the road empty-degree feature and/or the traffic flow feature, by using the road empty-degree of the main driving area in the each road image and/or the traffic flow information of the main driving area in the each road image.

The feature extracting unit 12, when recognizing the main driving area from the each road image in the sequence of the road images, by using the pre-trained image semantic segmentation model, may recognize, for the each road image, an area category corresponding to each pixel by using the pre-trained image semantic segmentation model, so as to determine a driving area and at least one road environment area from the each road image; and determine the main driving area from the driving area, by using the at least one road environment area.

The feature extracting unit 12, when extracting the image-related feature of the sample road from the sequence of the road images, may recognize a building area from each road image in the sequence of the road images, by using a pre-trained image semantic segmentation model; and calculate a similarity mean and/or a similarity variance of building areas of adjacent road images in the sequence of the road images, as the building feature of the sample road.

The model training unit 13 is used to train a classification model, by using the track-related feature of the sample road and the image-related feature of the sample road as an input of the classification model, and using the road condition label for the sample road as a target output of the classification model, so as to obtain the road condition estimation model.

Moreover, the model training unit 13 is further used to use a time feature corresponding to the first preset duration before the second moment, and/or a property feature of the sample road as the input of the classification model.

The classification model may be GBDT, DNN, LR, SVM and other models.

The road condition label may be congested traffic or smooth traffic. The road condition label may further be congested traffic, slow traffic or smooth traffic. Alternatively, the road condition label may be seriously congested traffic, congested traffic, slow traffic or smooth traffic.

The method and apparatus according to the embodiments of the present disclosure may be applied to, but not limited to, following scenarios.

In scenario 1, after the road condition is estimated using the method and apparatus of the embodiments of the present disclosure, road condition information of each road is displayed in the map application. For example, congestion conditions of each road are distinguished in the map in different colors.

In scenario 2, after the road condition is estimated using the method and apparatus of the embodiments of the present disclosure, congested roads shall be avoided when the user requests for route planning.

In scenario 3, after the road condition is estimated using the method and apparatus of the embodiments of the present disclosure, information of the congested roads is transmitted to a radio station for broadcast, or transmitted to a client of the map application for voice broadcast or for text display on an interface.

In scenario 4, after the road condition is estimated using the method and apparatus of the embodiments of the present disclosure, the road condition information of each road is stored in a database. A road condition information of a road is transmitted to the terminal device, in response to a query request, transmitted from the terminal device, for the road condition of the road.

According to the embodiments of the present disclosure, the present disclosure further provides an electronic device and a readable storage medium.

Figure 8:
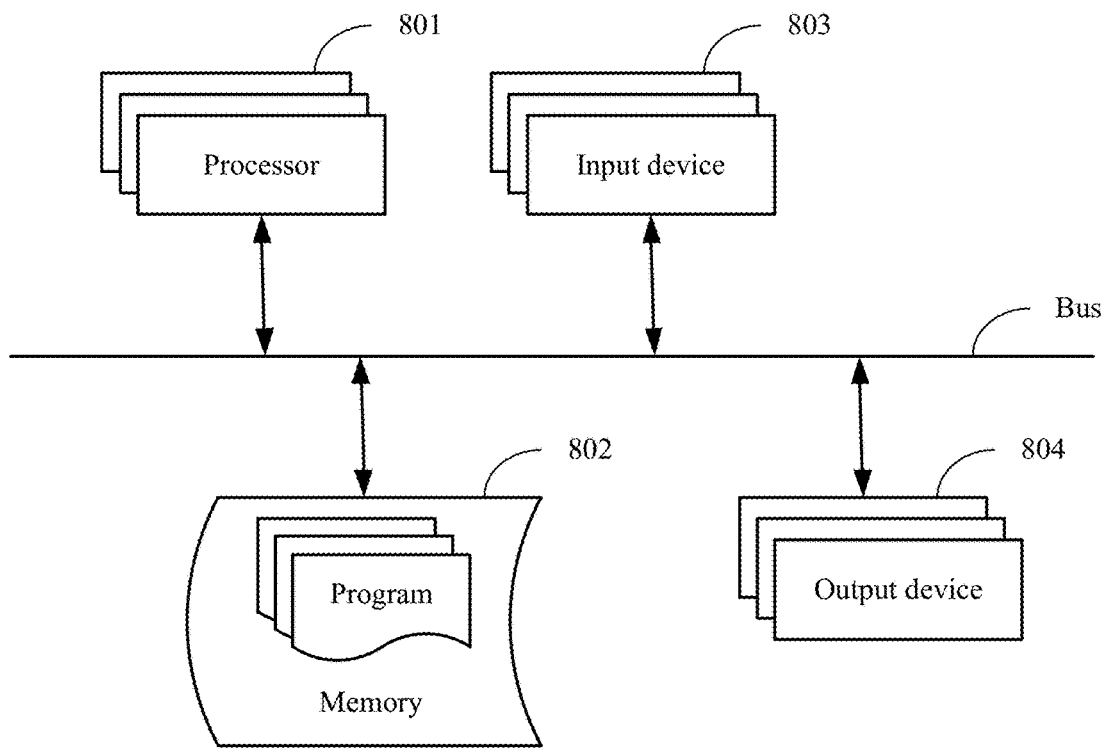
FIG. 8 shows a block diagram of an electronic device for implementing the embodiments of the present disclosure.

FIG. 8 shows a block diagram of an electronic device for the method of estimating a road condition and the method of establishing a road condition estimation model according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device may include one or more processors 801, a memory 802, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 8, a processor 801 is illustrated by way of example.

The memory 802 is a non-transitory computer-readable storage medium provided by the present disclosure. The memory stores instructions executable by at least one processor, to cause the at least one processor to perform the method of estimating a road condition and the method of establishing a road condition estimation model provided in the present disclosure. The non-transitory computer-readable storage medium of the present disclosure stores computer instructions for allowing a computer to execute the method of estimating a road condition and the method of establishing a road condition estimation model provided in the present disclosure.

The memory 802, as a non-transitory computer-readable storage medium, may be used to store non-transitory software programs, non-transitory computer-executable programs and modules, such as program instructions/units corresponding to the method of estimating a road condition and the method of establishing a road condition estimation model in the embodiments of the present disclosure. The processor 801 executes various functional applications and data processing of the server by executing the non-transient software programs, instructions and units stored in the memory 802, thereby implementing the method of pre-rendering the page in the embodiments of the method mentioned above.

The memory 802 may include a program storage area and a data storage area. The program storage area may store an operating system and an application program required by at least one function. The data storage area may store data etc. generated by using the electronic device according to the method of pre-rending the page. In addition, the memory 802 may include a high-speed random access memory, and may further include a non-transitory memory, such as at least one magnetic disk storage device, a flash memory device, or other non-transitory solid-state storage devices. In some embodiments, the memory 802 may optionally include a memory provided remotely with respect to the processor 801, and such remote memory may be connected through a network to the electronic device. Examples of the above-mentioned network include, but are not limited to the Internet, intranet, local area network, mobile communication network, and combination thereof.

The electronic device may further include an input device 803 and an output device 804. The processor 801, the memory 802, the input device 803 and the output device 804 may be connected by a bus or in other manners. In FIG. 8, the connection by a bus is illustrated by way of example.

The input device 803 may receive input information of numbers or character, and generate key input signals related to user settings and function control of the electronic device, such as a touch screen, a keypad, a mouse, a track pad, a touchpad, a pointing stick, one or more mouse buttons, a trackball, a joystick, and so on. The output device 804 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred to as programs, software, software applications, or codes) contain machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that operations of the processes illustrated above may be reordered, added or deleted in various manners. For example, the operations described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

We claim:

1. A method of estimating a road condition, comprising:
acquiring, for a first preset duration before a first moment, a sequence of user tracks for a road and a sequence of road images for the road;
extracting a track-related feature of the road from the sequence of the user tracks, and extracting an image-related feature of the road from the sequence of the road images; and
inputting the track-related feature of the road and the image-related feature of the road into a pre-trained road condition estimation model, so as to determine, for a second preset duration after the first moment, a road condition information of the road by using an estimated result of the road condition estimation model,
wherein the track-related feature includes a speed feature;
the image-related feature includes at least one of a road empty-degree feature, a traffic flow feature and a building feature; and
the extracting an image-related feature of the road from the sequence of the road images comprises:
recognizing a building area from each road image in the sequence of the road images, by using a pre-trained image semantic segmentation model; and
calculating a similarity mean and/or a similarity variance of building areas of adjacent road images in the sequence of the road images, as the building feature of the road.

2. The method of claim 1, wherein the road comprises at least one of:
a preset target road,
a road in an electronic fence for the road condition, and
a road where a track point meets a preset triggering condition for estimating the road condition.

3. The method of claim 1, further comprising:
transmitting information of the road to a collection terminal, so as to acquire the sequence of the user tracks and the sequence of the road images, wherein the sequence of the user tracks and the sequence of the road images are collected by the collection terminal; or
transmitting a collection instruction to a collection terminal on the road, so as to acquire the sequence of the user tracks and the sequence of the road images, wherein the sequence of the user tracks and the sequence of the road images are collected by the collection terminal on the road.

4. The method of claim 1, wherein the extracting an image-related feature of the road from the sequence of the road images comprises: recognizing a main driving area from each road image in the sequence of the road images, by using a pre-trained image semantic segmentation model; extracting, from the each road image, at least one of a road empty-degree of the main driving area and a traffic flow information of the main driving area; and obtaining the road empty-degree feature and/or the traffic flow feature, by using the road empty-degree of the main driving area in the each road image and/or the traffic flow information of the main driving area in the each road image.

5. The method of claim 4, wherein the recognizing a main driving area from each road image in the sequence of the road images, by using a pre-trained image semantic segmentation model comprises:

recognizing, for the each road image, an area category corresponding to each pixel by using the pre-trained image semantic segmentation model, so as to determine a driving area and at least one road environment area from the each road image; and determining the main driving area from the driving area, by using the at least one road environment area.

6. The method of claim 1, wherein features input into the road condition estimation model further comprises:

a time feature corresponding to the first preset duration before the first moment, and/or a property feature of the road.

7. A method of establishing a road condition estimation model, comprising:

acquiring training data, including a sequence of user tracks for a sample road for a first preset duration before a second moment, a sequence of road images for the sample road for the first preset duration before the second moment and a road condition label for the sample road for a second preset duration after the second moment;

extracting a track-related feature of the sample road from the sequence of the user tracks, and extracting an image-related feature of the sample road from the sequence of the road images; and training a classification model, by using the track-related feature of the sample road and the image-related feature of the sample road as an input of the classification model, and using the road condition label for the sample road as a target output of the classification model, so as to obtain the road condition estimation model, wherein the track-related feature includes a speed feature; the image-related feature includes at least one of a road empty-degree feature, a traffic flow feature and a building feature; and the extracting an image-related feature of the sample road from the sequence of the road images comprises:

recognizing a building area from each road image in the sequence of the road images, by using a pre-trained image semantic segmentation model; and calculating a similarity mean and/or a similarity variance of building areas of adjacent road images in the sequence of the road images, as the building feature of the sample road.

8. The method of claim 7, wherein the extracting an image-related feature of the sample rood from the sequence of the road images comprises: recognizing a main driving area from each road image in the sequence of the road images, by using a pre-trained image semantic segmentation model;

extracting, from the each road image, at least one of a road empty-degree of the main driving area and a traffic flow information of the main driving area; and obtaining the road empty-degree feature and/or the traffic flow feature, by using the road empty-degree of the main driving area in the each road image and/or the traffic flow information of the main driving area in the each road image.

9. The method of claim 8, wherein the recognizing a main driving area from each road image in the sequence of the road images, by using a pre-trained image semantic segmentation model comprises:

recognizing, for the each road image, an area category corresponding to each pixel by using the pre-trained image semantic segmentation model, so as to determine a driving area and at least one road environment area from the each road image; and determining the main driving area from the driving area, by using the at least one road environment area.

10. The method of claim 7, wherein the input of the classification model further comprises:

a time feature corresponding to the first preset duration before the second moment, and/or a property feature of the sample road.

11. An electronic device, comprising:

at least one processor; and a memory communicatively connected to the at least one processor, wherein the memory stores instructions executable by the at least one processor, and the instructions, when executed by the at least one processor, cause the at least one processor to implement operations of estimating a road condition, comprising:

acquiring, for a first preset duration before a first moment, a sequence of user tracks for a road and a sequence of road images for the road;

extracting a track-related feature of the road from the sequence of the user tracks, and extracting an image-related feature of the road from the sequence of the road images; and inputting the track-related feature of the road and the image-related feature of the road into a pre-trained road condition estimation model, so as to determine, for a second preset duration after the first moment, a road condition information of the road by using an estimated result of the road condition estimation model.

12. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 7.

13. A non-transitory computer-readable storage medium having computer instructions stored thereon, wherein the computer instructions allows a computer to implement the method of claim 1.

14. A non-transitory computer-readable storage medium having computer instructions stored thereon, wherein the computer instructions allows a computer to implement the method of claim 7.

* * * * *